3,019,103
Patented Jan. 30, 1962

3,019,103
PROCESS FOR PRODUCING SINTERED METALS WITH DISPERSED OXIDES
Guy B. Alexander, Brandywine Hundred, Del., and William H. Pasfield, Sayville, N.Y., assignors to E. I. du Pont de Nemours and Company, Wilmington, Del., a corporation of Delaware
No Drawing. Filed Nov. 4, 1957, Ser. No. 694,086
8 Claims. (Cl. 75—206)

This invention is concerned with improving the high-temperature service characteristics of iron, cobalt, and nickel and alloys of these metals with each other and with other metals whose oxides have a free energy of formation ($\Delta F$) at 27° C. of from 30 to 70 kilocalories per gram atom of oxygen (kcal./gm. at. O). The improvement is accomplished by incorporating in the metal very small particles of a refractory metal oxide.

More particularly the invention is directed to processes in which (a) a compound of the metal to be improved, wherein the metal is in an oxidized state, is formed as a coating around substantially discrete particles, having an average dimension of 5 to 250 millimicrons ($m\mu$), of a metal-oxygen compound which when heated to constant weight at 1500° C. is a refractory oxide having a melting point above 1000° C. and a $\Delta F$ at 1000° C. above 60 kcal./gm. at. O, (b) thereafter the coating is reduced to the corresponding metal while maintaining a temperature throughout the entire mass below the sintering temperature of the metal, and (c) the reduced product is sintered to a dense mass at a temperature below the melting point of the metal.

The processes of the invention are particularly adapted to the production of novel products comprising a dispersion of a particulate refractory oxide of the above-mentioned type, in a metal of the class to be improved, said metal product having a surface area less than 1 square meter per gram ($m.^2/g.$), and in a preferred aspect is adapted for the production of such metal products having an apparent density which is from 90 to 100% of the absolute density.

Attempts have already been made to incorporate refractory particles into such metals as copper in the hope that such inclusions might impart greater strength to the metals, especially at elevated temperatures. Obtaining an adequate degree of dispersion has been a problem, however, and it has not hitherto been known how to incorporate discrete, very finely divided refractory particles into iron, cobalt, and nickel and their alloys. Unless a complete, homogeneous dispersion is achieved none of the properties of the metal are improved, and some are, in fact, degraded. For this reason oxide occlusions in metals have been viewed with disfavor, and various means, such as scavenging with active metals, have been adopted to get rid of them.

Methods of combining such finely divided powders as aerogels with finely divided metals, using the techniques of powdered metallurgy, have been unsuccessful as a way to solve this problem. In such methods the aerogel is mixed with the solid metal, and the whole mass is subjected to very high pressures. Under these circumstances, the ultimate particles in the aerogel structure are forced into intimate contact, producing a densely aggregated structure which cannot be broken down and redispersed when the resulting compact is worked, either hot or cold. Thus, the compositions prepared by this technique consist of metal having very coarse oxide particles dispersed therein, the oxide particles being in the 10 to 100 micron range.

Now according to the present invention, it has become possible to incorporate substantially discrete, 5–250 $m\mu$ particles in metals of high melting point, the metal being selected from the group consisting of iron, cobalt and nickel and their alloys with each other and with other metals whose oxides have a $\Delta F$ at 27° C. of from 30 to 70 kcal./gm. at. O. In a preferred aspect of the invention, the oxide particles are dispersed in a continuous matrix of the metal, the entire composition having an apparent density which is from 90 to 100% of the absolute density of the metal.

THE FILLER

In describing this invention the dispersed refractory particles will sometimes be referred to as "the filler." The word "filler" is not used to mean an inert extender or diluent; rather it means an essential constituent of the novel compositions which contributes new and unexpected properties to the metalliferous product. Hence the filler is an active ingredient.

In processes of this invention, a relatively non-reducible oxide is selected as the filler, that is, an oxide which is not reduced to the corresponding metal by hydrogen, or by the metal in which it is embedded, at temperatures below 1000° C. Such fillers have a free energy of formation at 1000° C. of more than 60 kilogram calories per gram atom of oxygen in the oxide. The oxide can be used as a starting material or it can be formed during the process by heating another material as hereinafter described.

The metal-oxygen-containing material from which the filler is derived can, for example, be selected from the group consisting of oxides, carbonates, oxalates, and, in general, compounds which, after heating to constant weight at 1500° C., are refractory metal oxides. The ultimate oxide must have a melting point above 1000° C. A material with a melting point in this range is referred to as "refractory"—that is, difficult to fuse. If the filler particles melt or sinter at lower temperatures they become aggregated and cannot thereafter be dispersed to the desired degree.

Mixed oxides can be used as fillers, particularly those in which each oxide in the mixed oxide conforms to the melting point and free energy of formation requirements above-stated. Thus, magnesium silicate, $MgSiO_3$, is considered as a mixed oxide of $MgO$ and $SiO_2$. Each of these oxides can be used separately; also, their products of reaction with each other are useful. By "dispersion of an oxide" is meant a dispersion containing a single metal oxide or a reaction product obtained by combining two or more metal oxides. Also, two or more separates oxides can be included in the products of the invention. The term "metal oxide filler" broadly includes spinels, such as $MgAl_2O_4$ and $ZnAl_2O_4$, metal carbonates, such as $BaCO_3$, metal aluminates, metal silicates such as magnesium silicate and zircon, metal titanates, metal vanadates, metal chromites, and metal zirconates. With specific reference to silicates, for example, one can use complex structures, such as sodium aluminum silicate, calcium aluminum silicate, calcium magnesium silicate, calcium chromium silicate, and calcium silicate titanate.

Typical single oxides which are useful as the filler include silica, alumina, zirconia, titania, magnesia, hafnia, and the rare earth oxides including thoria. A typical group of suitable oxides, and their free energies of formation is shown in the following table.

| Oxide: | $\Delta F$ at 1000° C. |
|---|---|
| $Y_2O_3$ | 125 |
| CaO | 122 |
| $La_2O_3$ | 121 |
| BeO | 120 |
| $ThO_2$ | 119 |
| MgO | 112 |
| $UO_2$ | 105 |
| $HfO_2$ | 105 |
| $CeO_2$ | 105 |
| $Al_2O_3$ | 104 |
| $ZrO_2$ | 100 |
| BaO | 97 |
| $ZrSiO_4$ | 95 |
| TiO | 95 |
| $TiO_2$ | 85 |
| $SiO_2$ | 78 |
| $Ta_2O_5$ | 75 |
| $V_2O_3$ | 74 |
| $NbO_2$ | 70 |
| $Cr_2O_3$ | 62 |

The filler oxide must be in a finely divided state. The substantially discrete particles should have an average dimension in the size range from 5 to 250 m$\mu$, an especially preferred range being from 5 to 150 m$\mu$, with a minimum of 10 m$\mu$ being even more preferred.

The particles should be dense and anhydrous for best results, but it will be understood that aggregates of smaller particles can be used, provided that the discrete particles of aggregate are within the above-mentioned dimensions. Particles which are substantially spheroidal or cubical in shape are also preferred, although anisotropic particles such as fibers or platelets can be used for special effects. Anisotropic particles produce metal compositions of lower ductility, however, and in those instances where ductility is desired, particles approaching isotropic form are preferred.

When the size of a particle is given in terms of a single figure, this refers to an average dimension. For sperical particles this presents no problem, but with anisotropic particles the size is considered to be one-third of the sum of the three particle dimensions. For example, a fiber of asbestos might be 500 m$\mu$ long but only 10 m$\mu$ wide and thick. The size of this particle would be $$\frac{500+10+10}{3}$$

or 173 m$\mu$, and hence within the limits of this invention.

Colloidal metal oxide aquasols are particularly useful as a means of providing the fillers in the desired finely divided form. Thus, for example, silica aquasols such as those described in Bechtold et al. U.S. Patent 2,574,902, Alexander U.S. Patent 2,750,345, and Rule U.S. Patent 2,577,485 are suitable as starting materials in processes of this invention. Zirconia sols are likewise useful. The art is familiar with titania sols, and such sols as descrbed by Weiser in "Inorganic Colloidal Chemistry," volume 2, "Hydrous Oxides and Hydroxides," for example, can be used to advantage.

Although they are less preferred, aerogels and reticulated powders can also be used. For example, products described in Alexander et al. U.S. Patent 2,731,326, can be employed, but in these instances it is necessary that the aggregate structures be broken down at some point in the process to particles in the size range specified.

Powders prepared by burning metal chlorides, as, for example, by burning silicon tetrachloride, titanium tetrachloride, or zirconium tetrachloride to produce a corresponding oxide, are also very useful if the oxides are obtained primarily as discrete, individual particles, or aggregated structures which can be dispersed to such particles. However, because colloidal metal oxide aquasols already contain particles in the most desirable size range and state of subdivision, these are preferred starting materials for use as a filler.

A particularly preferred filler, for instance, is calcium oxide. Since this oxide is water-soluble or, more accurately, water-reactive, one cannot obtain aqueous dispersions in the colloidal state with it. In this instance, one can use an insoluble calcium compound, such as the carbonate or oxalate, which, on heating, will decompose to the oxide. Thus, for example, particles of finely divided calcium carbonate can be coated with a hydrous iron oxide by treating a dispersion of finely divided calcium carbonate with ferric nitrate and sodium carbonate. On heating the precipitate and reducing, a dispersion of calcium oxide in iron is obtained. Similarly, one can obtain dispersions of barium oxide, strontium oxide, or magnesia in the metal being treated.

THE METAL

The metal in which a refractory oxide is to be incorporated according to the invention is selected from the group consisting of iron, cobalt, and nickel and alloys of these metals with each other and with metals whose oxides have a free energy of formation at 27° C. of from 30 to 70 kcal./gm. at. O. These alloying metals, and the free energies of formation of their oxides are as follows.

| Metal: | $\Delta F$ at 27° C. |
|---|---|
| Cu | 35 |
| Cd | 55 |
| Tl | 40 |
| Ge | 58 |
| Sn | 60 |
| Pb | 45 |
| Sb | 45 |
| Bi | 40 |
| Mo | 60 |
| W | 60 |
| Re | 45 |
| In | 65 |

COATING THE FILLER

In processes of this invention, a relatively large volume of the metal oxide, hydroxide, hydrous oxide, oxycarbonate, or hydroxycarbonate, or, in general, any compound of the metal wherein the metal is in an oxidized state, is formed as a coating around the refractory oxide filler. This coating can be a compound of single metal, or it can contain two or more metals. For example, the hydrous oxides of both nickel and cobalt can be deposited around a filler. In the latter case, an alloy of nickel and cobalt is produced directly, during the reduction step.

In a similar manner, alloys of iron, cobalt or nickel with other metals, which form oxides which can be reduced with hydrogen, can be prepared. Thus alloys with copper, molybdenum, tungsten, and rhenium can be prepared by codepositing two or more oxides of the selected metals on the filler particles.

To produce such a hydrous oxygen-containing composition one can precipitate it from a soluble salt, preferably a metal nitrate, although metal chlorides, sulfates, and acetates can be used. Ferric nitrate, cobalt nitrate, and nickel nitrate are among the preferred starting materials.

The precipitation can be conveniently accomplished by adding a suitable soluble metal salt to an aqueous alkaline solution containing the filler particles, while maintaining the pH above 7. A good way to do this is to add, simultaneously but separately, the solution of the soluble metal salt, a colloidal aquasol containing the filler particles, and an alkali such as sodium hydroxide, to a heel of water. Alternatively, a dispersion containing the filler products can be used as a heel, and the metal salt solution and alkali added simultaneously but separately thereto.

More broadly, in depositing the compound of a metal in an oxidized state upon the filler, one can react any soluble salt of these metals with a basic material. Hydroxides such as NaOH, KOH, or ammonia, or carbonates such as $(NH_4)_2CO_3$, $Na_2CO_3$ or $K_2CO_3$ can be used. Thus, the metal compound deposited can be an oxide, hydroxide, hydrous oxide, oxycarbonate, or in general, a compound which, on heating, will decompose to the oxide.

During the coating process certain precautions are preferably observed. It is preferred not to coagulate or gel the colloid. Coagulation and gelation are avoided by working in dilute solutions, or simultaneously adding the filler and the metal salt solution to a heel.

It is prefered that the filler particles be completely coated with the reducible oxides or hydrous oxides such as those of iron, cobalt or nickel, so that when reduction occurs later in the process, aggregation and coalescence of the filler particles is avoided. In other words, it is preferred that the ultimate particles of the filler be not in contact, one with another, in the coprecipitated product. Another condition which is important during the preparation to insure this condition is to use vigorous mixing and agitation.

Having deposited the hydrous oxygen compound of iron, cobalt or nickel on the filler, it is then desirable to remove the salts formed during the reaction, by washing. Ordinarily, one uses an alkali such as sodium hydroxide, potassium hydroxide, lithium hydroxide, ammonium or tetramethylammonium hydroxide in the deposition of the compound. As a result, salts like sodium nitrate, ammonium nitrate or potassium nitrate may be formed. These should be removed, since otherwise they may appear in the final product. One of the advantages of using the nitrate salts in combination with aqueous ammonia is that ammonium nitrate is volatile, and therefore is easily removed from the product. However, the tendency of many metals, such as cobalt and nickel, particularly, to form ammine complexes, is a complicating reaction in this case. By carefully controlling the pH during coprecipitation, these side reactions can be avoided.

Having essentially removed the soluble nonvolatile salts by washing, the product is then dried at a temperature above 100° C. Alternatively, the product can be dried, and the dry material suspended in water to remove the soluble salts, and thereafter the product redried.

PROPORTIONS OF COATING AND FILLER

The relative amount of oxidized metal compound coating which is deposited on the filler particles depends on the end use to which the product is to be put. For example, if the product is to be reduced and compacted directly to a dense mass of filler metal, then from 0.5 to 10 volume percent of filler in the metal composition is a preferred range, and 1 to 5 volume percent is even more preferred. On the other hand, if the product is to be used as a masterbatch, as for example for blending with unmodified metal powder before compaction, then considerably higher volume loadings can be used.

Volume loadings as high as 50%, that is, one volume of oxide for each volume of metal present, can be successfully used, but such products are often pyrophoric. Even heating to 1000° C. after reduction does not completely eliminate this problem. Also, the filler particles in such products tend to coalesce to form large, hard aggregates during the reduction step. This tendency can be reduced by increasing the particle size of the filler, say to 100 millimicrons or even larger. The problems just discussed are minimized as the volume loading is reduced. In the range of 40–50 volume percent of filler, it is advisable to protect the modified metal in an inert atmosphere (hydrogen, argon or nitrogen) until the material is blended with unmodified metal and compacted. At 30 volume percent, one can usually sinter the modified metal mass sufficiently that it can be handled in air.

Ordinarily, in processes of this invention, relatively large amounts of a hydrous oxygen compound of one of the metals, iron, cobalt or nickel, will be applied as a coating to relatively small amounts of filler. The amount of coating material will vary somewhat with the particle size of the filler, and especially with the surface area thereof. In general, from 0.05 to 20% volume loading of filler in the final metal compositions is desired. However, with smaller filler particles, having a surface area greater than $200/D$ m.$^2$/g. (D being the density of the filler in g./ml.) volume loadings of from 0.05 to 5% are preferred. In an especially preferred case, the relative amounts used are such that from 0.1 to 5 volume percent filler will result in the final metal-metal oxide composition after reduction. With relatively large particles—those, for example, in the size range of about 100 millimicrons—one can use volume loadings as high as 20%.

REDUCING THE COATING ON THE FILLER

Having deposited the coating of compound of metal in oxidized state on the filler particles and washed and dried the product, the next step is to reduce the coating to the metal. This can be conveniently done by subjecting the coated particles to a stream of hydrogen at a somewhat elevated temperature. However, the temperature throughout the entire mass must not be allowed to exceed the sintering temperature of the filler particles. One way to accomplish this is to place the product in a furnace at controlled temperature, and add hydrogen gas slowly. Thus the reduction reaction will not proceed so rapidly that large amounts of heat are liberated and the temperature in the furnace is increased.

Hydrogen to be used in the reduction can be diluted with an inert gas such as nitrogen to reduce the rate of reaction and avoid "hot spots." In this way the heat of reaction will be carried away in the gas stream. Alternatively, the temperature in the furnace can be slowly raised into the range of 500 to 700° C. while maintaining a flow of hydrogen over the product to be reduced.

In addition to, or instead of, hydrogen, carbon monoxide can be used as the reducing agent, particularly at elevated temperatures, as well as methane or other hydrocarbon gases. In any case, it is important that the temperature during reduction be controlled, not only to avoid premature sintering as above-mentioned, but also so that excessive reaction will not occur between the reducible compound (such as iron, cobalt or nickel oxide) and the filler oxide before the reducible compound is reduced.

Reduction should be continued until the coating is essentially completely reduced. When the reaction is nearing completion, it is preferred to raise the temperature to the range between 700 and 1300° C. to complete the reduction reaction, but care must be taken not to exceed the melting point of the reduced metal. Reduction should be carried out until the oxygen content of the mass is substantially reduced to zero, exclusive of the oxygen of the oxide filler material. In any case, the oxygen content of the product, exclusive of the oxygen in the filler, should be in the range from 0 to 2% and preferably from 0 to 0.1%, based on the weight of the product.

One way of estimating the oxygen content is to measure the change in weight of a product on treatment with dry, oxygen-free hydrogen at 1300° C. Products which show a change in weight of only from 0.0 to 0.1% under this condition are preferred.

After the reduction reaction is complete, the resulting powder is sometimes pyrophoric. Therefore it is preferred to cool the mass in an inert atmosphere, and further compact the mass to reduce surface area in the absence of oxygen, if this is necessary to prevent reoxidation. These materials are useful in making metal objects by conventional powder metallurgy techniques.

SINTERING THE REDUCED PRODUCT

After the coating has been reduced to the corresponding metal the product is sintered by heating it to an elevated temperature which is, however, below the melting point of the metal. It will be recognized that when very high temperatures are used during the reduction step, some sintering can occur simultaneously with reduction; however, such temperatures should be reached only after the reduction has proceeded to a considerable degree and preferably is substantially complete.

The sintering insures that the products will not be readily reoxidized in air. It also converts to the corresponding oxides such filler materials as metal carbonates and oxalates.

Sintering of the product is continued until the surface area is lowered below 1, and preferably below 0.1, square meter per gram. Such products are not pyrophoric and can be handled in air.

It has been observed that the temperature required to obtain the desired degree of sintering varies with the loading of the filler in the metal. In general, the higher the loading, the higher is the sintering temperature required. Also, the smaller the filler particles, the higher the sintering temperature required.

It is important that, during this sintering operation, the melting point of the metal be not exceeded. Actually, it is preferred to maintain the temperature at least 50 centigrade degrees below the melting point.

In addition to sintering, one can react the reduced mass with an amount of oxygen sufficient to produce about 1-3 monolayers of metal oxide on the surface of the metal powder. It is preferred, however, to reduce the oxygen content of the metal matrix essentially to zero and to protect the metal against reoxidation until the mass is compacted to a dense mass of metal.

COMPACTING THE PRODUCT

In a preferred process of this invention, the entire mass of reduced metal and oxide filler is compacted. This can be done by subjecting the product to very high pressures, preferably at temperatures equivalent to about ⅔ of the absolute melting point of the metal coating. In some instances, it is desirable to heat the product during this pressing operation to temperatures just slightly below the melting point or even as high as the melting point. Obviously, the compacting can be effected simultaneously with the sintering step.

In order to obtain a strong bond between the particles of the finely divided reduced powder, it may be desired to hot- or cold-work the resulting composition, as, for example, by rolling, hot extruding or similar techniques well known in the metallurgical art. However, working in order to improve dispersion is not necessary; by the processes above described, dispersion is obtained directly.

The product preferably is compacted until it has reached at least 90% of theoretical density. Such products are improved not only in strength, but also in oxidation resistance. For instance, the oxidation resistance of the metals iron, cobalt and nickel and alloys in which these metals are the major component can be so much improved that they can be used at 1000° C. without serious oxidation. Thus the need for alloying with other metals to improve oxidation resistance is eliminated.

The compacting can be carried out in the presence of unfilled metal powders. Thus, compositons of this invention can be used as a masterbatch in making powder metallurgical products. For example, an iron product containing zirconia can be used as a masterbatch and alloying agent in other metallurgical compositions, and can further be diluted with untreated iron as a finely divided powder, or can also be used as an alloying agent for other metals, such as, for example, copper, molybdenum, nickel, and tungsten. Compacting to a dense body can be effected after mixing the iron containing the zirconia with the finely divided powders of the other metals.

In a similar manner, masterbatches of cobalt or nickel containing the desired fillers can be used to prepare various alloys. For example, an improved type of nickel-copper alloy can be prepared by dispersing zirconia in nickel and thereafter alloying the nickel with copper by powder metallurgical techniques. The oxidation resistance of products made in this manner is also improved, but some such products show signs of internal oxidation. Even so, such materials are more oxidation resistant than the unmodified metals, the extent of improvement being related to the amount of dilution with unmodified metal.

ALLOYS

In general, alloys containing a metal of the ferrous group—iron, cobalt, and nickel, with metal oxide particles uniformly dispersed throughout the metal matrix, are products of this invention. Thus, ferrous alloys like nickel steel, high molybdenum steel (e.g., 86% Fe, 14% Mo), nickel molybdenum steel (e.g., 2% Ni, 1% Mo), nickel alloys like Monel metal (copper, iron, nickel alloys), the Hastelloy metals (molybdenum, iron, nickel alloys), and iron tungsten alloys, particularly those containing up to 20% tungsten, are important and useful compositions of the invention.

These alloys can be prepared directly, by co-depositing hydrous oxides of the metals on the selected oxide filler and reducing with hydrogen. Such a process is particularly useful for alloys of iron and metals below it in the electromotive series of metals. Thus, for example, an alloy containing nickel and copper can be prepared by depositing hydrous nickel oxide and hydrous copper oxide on colloidal thoria filler and reducing. Similarly, alloys of nickel-molybdenum, cobalt-iron-nickel, cobalt-copper, nickel-tungsten, and many others can be so produced. In general, alloys of metals between copper and iron in the E.M.F. series can be prepared in this manner.

Products of this invention thus include not only modified ferrous group metals, but also these metals in combination with each other and with certain other metals. In the latter group are alloys and metal products containing metals whose oxides have a free energy of formation at 27° C. of from 30 to 70 kilocalories per gram atom of oxygen, together with at least one ferrous-group metal.

Preferred alloys of the last-mentioned group can be prepared by combining 1 part of an oxide-modified ferrous-group metal powder with 0.1 to 100 parts of the unmodified other metal. As a specific example, a nickel-molybdenum alloy can be prepared from a masterbatch of nickel-thoria, nickel-alumina or nickel-calcia. In making masterbatches, higher loadings of oxides are used, volume loadings in the range from 2 to 20 percent being preferred. In this way, a modified nickel powder of very high hardness is produced. This modified nickel powder is then blended with a nickel-molybdenum, oxide-free powder, rich in molybdenum. Blending is accomplished by tumbling the powders (which are preferably small enough to pass through a 325 mesh screen in a conical or cubical container for several hours. The blended powder is compacted to a non-porous mass, i.e, having a density at least 95% of absolute density. Thereafter, the compositon is heat soaked and worked, for example, at 1300° C., in order to diffuse the molybdenum throughout the nickel. The resulting composition, containing nickel as a metallic component, is considerably more ductile than a composition containing similar components but made directly. In making alloys in this manner it is important to use powders which are essentially oxygen free, except for the oxygen in the filler.

It is believed that the reason for the above-mentioned improvement in ductility is that the composition made by powder dilution from a masterbatch consists of two phases: one phase of ductile, unmodified metal and another phase of extremely hard, highly reinforced metal. The unmodified phase gives the composition ductility and the hard phase (metal+oxide) gives it unusual strength at high temperatures. Thus the advantage of the above dilution technique is that it produces a metal material of higher ductility and lower hardness, and at the same time gives high temperature strength properties due to the presence of the oxide filler.

Similarly, alloys of the ferrous metals with other metals of the class described, particularly the high melting metals, can be produced. Specifically included, for example, are alloys with molybdenum, tungsten, copper, rhenium and indium.

When compositions of the invention are used in making alloys, it is important that the resulting mass be compacted to as high a density as possible, for example, to a density in the range of from 90 to 100% of theoretical, and preferably in the range from 98 to 100% of theoretical. This can be done by hot-working the alloy composition, as, for example, by rolling or extruding.

CHARACTERIZATION OF PRODUCTS

It will be understood, of course, that in addition to alloys as above-described, products of the invention include the individual metals—iron, cobalt and nickel—modified with the dispersed refractory oxide particles. In the product characterizations which follow, descriptions will sometimes be given with particular reference to such single-metal compositions of the invention, but it will be apparent that the characterizations can also be applied to the alloy products.

The filler particles present in the metal grains of products of this invention are uniformly dispersed—that is, the particles are found both at the grain boundary and inside the grain.

This dispersion can be demonstrated, using the electron microscope and replica techniques wherein the surface of a metal piece is polished, a carbon layer is deposited on the polished surface, and the metal is removed, as by dissolving in acid. An electron micrograph of the remaining carbon film shows that the filler particles are uniformly distributed throughout the metal grains. Because of this, useful metal parts can be made by directly compacting the metal-metal oxide powders as prepared by the invention. This eliminates the necessity of working in order to improve dispersion.

By "uniformly dispersed" is meant that there is uniform distribution of the refractory oxide particles within any single selected microscopic region of treated metal, such regions being about 10 microns in diameter. When treated metal powder is blended with untreated metal powder and the mixture is compacted and sintered to dense metal, it is obvious that only those regions originating from particles of treated metal powder will contain a uniform distribution of the filler in the metal matrix.

The filler particles in compositions of the invention must be in the size range below 1000 millimicrons, and should be from 5 to 250 millimicrons. Still more preferably they should be from 10 to 150 millimicrons. The latter class is particularly preferred, since the 10 millimicron particles are considerably more difficult to coagulate or gel, and thus easier to maintain in a dispersed state during the processes of this invention, than smaller particles, and the 150 millimicron particles are still within the colloidal range. Thus, products containing filler particles in the size range of from 10 to 150 millimicrons can be readily produced according to processes of this invention from colloidal aquasols. Although very small particles can be used, these are difficult to handle because they sinter easily when dried and gel easily in liquid phases. Moreover, very small particles are extremely reactive. Five millimicron particles can be used, but 10 millimicron particles are easier to use.

In describing products of this invention an oxide filler particle is defined as a single coherent mass of oxide surrounded by metal and separated from other oxide mass by metal. The particles may be aggregates of smaller ultimate units, which are joined together to form a structure.

The particles of the filler in compositions of the invention are substantially completely surrounded by a metal coating which maintains them separate and discrete. The particles are thus isolated, and do not come in contact one with another; thus coalescence and sintering of the filler material is prevented.

Metal compositions in which the filler is thoria, a rare earth oxide, or a mixture of oxides of the rare earth elements of the lanthanum and actinium series, magnesium oxide, or, to a lesser extent, calcium silicate, appear to have exceptional stability in elevated-temperature, long-continued tests such as stress rupture and creep tests. These materials maintain their properties to a considerably greater extent than metals filled with silica, for example, even when the initial hardness obtained during the processing operation is similar. The reason for this improvement appears to be related to the free energy of formation of the filler. For this reason, preferred compositions of the invention for use at very high temperatures, i.e., 800° to 1000° C., comprise a dispersion, in a metal, selected from iron, cobalt and nickel, of oxide particles having a size in the range 5 to 200 millimicrons, at volume loadings from 1.0 to 10%, the oxide in the dispersion having a free energy of formation at 27° C., per gram atom of oxygen atom in the oxide, of more than 90 kcal. and preferably more than 110 kcal.

Actually, silica is a highly efficient filler for ferrous metal compositions which do not need to be heated above 600 to 700° C. during processing or use. In the case of iron-molybdenum or nickel-molybdenum alloys, which are made by blending molybdenum powder with powders of modified iron or modified nickel, temperatures as high as 1300° C. or slightly higher are often encountered during processing. In these cases, only the very stable oxides are effective as fillers, i.e., those with a very high free energy of formation, such as the rare earth oxides or calcia. (For free energy of formation data, see, for example, Smithell's "Metal Reference Book," 2nd Edition, volume 2, p. 592, Interscience Publishers, Inc., New York, 1955.)

The compositions of one aspect of the invention comprise a continuous phase of a metal from the group consisting of iron, cobalt, or nickel, containing dispersed therein the non-reducible oxide filler. That the metal is essentially the continuous phase can be demonstrated by compacting the reduced mass, sintering, and measuring conductivity. The conductivity of the metal is essentially unaffected by the presence of the oxide, if the metal is present as a continuous phase. If, on the other hand, the metal is dispersed, and the oxide is the continuous phase, conductivity will be drastically reduced.

The metal products of the invention exhibit isotropy in physical characteristics. Thus, if one measures such a property as yield strength in any given direction in a mass of the metal product, one will find that measurement of the strength along an axis at a 90 degree angle to the original given direction will produce a similar value of yield strength, i.e., within 50%.

When prepared directly, the products of the invention are uniform dispersions of oxide particles in metals. By uniform is meant that the oxide is distributed essentially homogeneously throughout the metal, and the oxide is present inside the grains as well as at the grain boundaries. Specifically, if one examines an electron micrograph prepared by the carbon replica technique, one will find that the ratio of the concentration of oxide particles along the grains to the concentration of oxide in the samples is less than 10:1 and specifically in the range from 0.1:1 to 10:1.

Often, the grains in the compositions of the invention are so small that grain boundaries are difficult to find.

Such a measurement can be made as follows: Prepare a micrograph by the carbon replica method, and select an area typical of grain boundaries. Measure an area along said grain for a distance of 100D, where D is the number average particle size, and 2D wide on either side of the grain, i.e., an area of $400D^2$. Count all the particles in this area; let this number be $N_1$. Measure another representative area 20D on each side, preferably inside a grain, and at a distance at least 2D away from any grain boundary, i.e., an area $400D^2$ which is a square. Count all the particles in this area, $N_2$. $N_1/N_2$ will be in the range of 0.1:1 to 10:1 for products of the invention.

Compositions of this invention are especially useful for fabrication into components which must maintain dimensional stability under heavy stress at high temperatures, such as turbine blades.

While in the foregoing description processes of the present invention have been described with especial reference to their applicability to modifying iron, cobalt, and nickel and their alloys, it will be understood that the processes are also applicable to modifying metals broadly, and especially to modifying copper, silver, and gold and their alloys with each other, molybdenum, tungsten, and rhenium and their alloys with each other, and lead, tin, bismuth, and their alloys with each other. Moreover, products in which the dispersed refractory particles described have a size up to one micron can be prepared by the processes.

The invention will be better understood by reference to the following illustrative examples.

Example 1

A solution of ferric nitrate was prepared by dissolving 500 g. of ferric nitrate hydrate in water and diluting this to 1 liter. A commercial silica sol, prepared according to Example 3 of Bechtold and Snyder U.S. Patent 2,574,902, containing substantially discrete particles having an average diameter of about 17 millimicrons, having an $SiO_2:Na_2O$ weight ratio of about 90:1, and known as "Ludox" HS, was used as the source of the filler material. A 1.7 g. portion of this colloidal aquasol (30% $SiO_2$) was diluted to 1 liter. To a heel containing 1 liter of water at room temperature the solution of ferric nitrate, the diluted "Ludox" solution, and 5 N ammonium hydroxide were added as separate solutions simultaneously, and at uniform rates while maintaining very vigorous agitation. A coating of ferric hydroxide was thus deposited around the silica particles. The resulting mixture was filtered, and washed to remove the ammonium nitrate. The filter cake was dried in an oven at 110° C. to remove substantially all of the water.

The product obtained was compacted into a porous billet and placed in an oven at a temperature of 450° C. Hydrogen was slowly passed over the billet at such a rate that sufficient hydrogen was added to the ferric oxide to reduce it in a period of four hours. The flow of hydrogen was maintained at a steady, uniform rate during this reduction procedure for eight hours. Thereafter, the temperature was raised to 500° C. while maintaining the flow of pure, dry hydrogen at the same rate, and finally the temperature was raised to 700° C. and the flow of dry hydrogen was increased twenty fold, to complete the reduction. The resulting product was compressed in a 1" die at 450° C. and 20 tons per square inch and finally extruded through a die to form a wire, using an area reduction ratio of 10:1.

The iron powder obtained is useful in powder metallurgical applications, for the fabrication of iron parts. Such parts are useful at temperatures below about 600° C.

Example 2

A process of Example 1 was repeated except that a solution of nickel nitrate was used in place of the ferric nitrate, and a zirconia sol used in place of the "Ludox." As a result, a billet of nickel containing 0.5% zirconia (by weight) was prepared. The zirconia was present in the nickel as discrete particles having approximately cubical shape, the zirconia particles being on the average 10 millimicrons in size.

Example 3

In this example, iron oxide was deposited on a core of titania, by using a titania aquasol of particles in the size range of 50 millimicrons, the resulting composition being prepared at a 2 volume percent loading of titania in iron.

Example 4

A solution of ferric nitrate hydrate prepared as in Example 1 was mixed in the fashion of Example 1 with an aqueous sol comprising 20 millimicron particles of calcium orthosilicate. This sol was prepared by the hydrolysis of B-calcium orthosilicate in liquid water at 100° C. to give hillebrandite in an amorphous colloidal form. This material was milled by 7 passes in a Gaulin homogenizer to give particles having a size of 20 millimicrons. The resulting colloidal dispersion was mixed with the ferric nitrate in a fashion as described in Example 1 for silica, such as to deposit the hydrous oxide on the surface of the amorphous hillebrandite colloidal particles. The proportions of colloidal calcium silicate and ferric nitrate were adjusted to give a final composition containing 1% by volume of the colloidal calcium silicate. The resulting structure was then dried in an oven at 200° C. and the temperature progressively increased until it reached 600° C., at which point the hillebrandite was converted back to crystalline B-calcium orthosilicate. The composition, after drying at this temperature for 2 hours, was reduced as in Example 1. The resulting metal-colloidal calcium silicate composition was cold pressed at 50 tons per square inch, sintered for 1 hour at 1100° C. in a hydrogen atmosphere, and hot rolled at 1100° C. to get a sheet of theoretical density. Exceptionally stable high temperature properties were exhibited by materials cut from this sheet.

Example 5

A solution of nickel nitrate was prepared by dissolving 4362 g. of nickel nitrate hydrate $Ni(NO_3)_2 \cdot 6H_2O$ in water and diluting this to 5 liters. A thoria sol, stabilized with a trace of nitric acid, containing substantially discrete particles having an average diameter of about 5 to 10 millimicrons, was used as the source of the filler material. A 28.8 g. portion of this colloidal aquasol (26% $ThO_2$) was diluted to 5 liters. To a heel containing 5 liters of water at room temperature, the solution of nickel nitrate, the diluted thoria sol, and ammonium hydroxide-ammonium carbonate solution were added as separate solutions simultaneously, and at uniform rates, while maintaining very vigorous agitation. During the precipitation, the pH in the reactor was maintained at 7.5. A coating of nickel hydroxide-carbonate was thus deposited around the thoria particles. The resulting mixture was filtered, and washed to remove the ammonium nitrate. The filter cake was dried in an oven at 300° C.

The product obtained was pulverized with a hammermill to pass 325 mesh, placed in an oven, and heated to a temperature of 500° C. Hydrogen was slowly passed over the powder at such a rate that sufficient hydrogen was added to the nickel oxide to reduce it in a period of four hours. The flow of hydrogen was maintained at a steady, uniform rate during this reduction procedure for eight hours. Thereafter, the temperature was raised to 700° C. and the flow of dry, pure hydrogen was greatly increased, and finally the temperature was raised to 750° C. to complete the reduction. The resulting product was compressed in a 1" die at 20 tons per square inch, sintered in dry hydrogen by slowly increasing the temperature to 1200° C. over a period of 6 hours in order to reduce the last traces of nickel oxide and further densify the green compact, machined to ¾" dia., and finally extruded through a die to form a rod 3⁄16" dia.

The resulting nickel, modified with 1 volume percent thoria, is an example of a product of the invention. After annealing at 1200° C., it had a yield strength (0.2% offset), measured at 1500° F., of 15,000 p.s.i.

Electron micrographs were prepared by replica technique of the thoria from the polished surface of this Ni-$ThO_2$ product. It was evident from these micrographs that the thoria was homogeneously distributed in the metal matrix. By this is meant that, if an area of about 10 square microns were examined, and the number of particles in this area determined, then the number of particles in this area is approximately equal (±about 20%) to the number of particles found in an electron micrograph taken of some other area in the sample. The thoria particles were actually inside the metal grain, as well as at the grain boundaries. However, there is no concentration of particles at said grain boundaries.

The electron micrographs were prepared as follows: A ¼″ rod of nickel containing dispersed thoria was cut and the cross section was electropolished. The electropolished surface was cleaned and dried in ethyl alcohol. The samples were then placed in a high vacuum evaporator and a vacuum of $10^{-5}$ mm. of Hg was reached. At this time two carbon rods were brought together within the evaporator and current applied until sputtering occurred. A very thin film of carbon was deposited upon the electropolished surface as the sputtering occurred.

The carbon-covered, electropolished surface was scribed into 1/16 in. square with the use of a sharp cutting blade.

Next the sample was placed in a culture dish containing a 2% solution of nitric acid. In a few seconds the carbon squares were freed from the surface of the metal by chemical etching. They floated to the surface of the solution, were picked up on electron microscope screens (250 mesh S/S wire), and viewed in the electron microscope.

The solution of nitric acid was used to remove the carbon because the acid would attack the base metal and not do any damage to the oxide.

All samples were photographed in the electron microscope at a film magnification of 1,250× and 5,000×, respectively. Prints at 5,000× were made from the 1,250× negative and at 20,000× from the 5,000× negative. The presence of subgrain boundaries (lines) in the 20,000× picture was plainly observable.

The elevated-temperature strength of the material of this example was many times greater than a comparable sample of nickel containing no thoria. A particularly outstanding aspect of the high temperature properties of this material was the fact that these properties were almost completely unchanged by exposures at temperatures exceeding 900° C. for periods of time ranging greater than 100 hours. This is in sharp contrast to the instability of precipitation-hardened or age-hardened conventional alloys.

*Example 6*

A procedure similar to that of Example 5 was employed to prepare a composition comprising 3 volume percent of the mixed rare earth oxides in cobalt. The mixed oxides were incorporated into the cobalt in the form of a colloidal aquasol prepared by the reaction of ammonia with the chloride salts. The resulting compact, after reduction, hot-pressing, and hot-coining was in excess of 98% theoretical density and exhibited improved high temperature properties.

In a similar way, these rare earth oxides ($La_2O_3$, $Nd_2O_3$, $Pr_6O_{11}$ and $Sm_2O_3$) can be incorporated into iron or nickel. Such compositions are useful by themselves, or for mixing, by powder metallurgy, these modified metals with unmodified metals including Fe, Co, Ni, Cu, Mo, and W.

*Example 7*

A colloidal dispersion comprising 100 millimicron average particle diameter magnesium carbonate was prepared by precipitating magnesium chloride solution with sodium carbonate. This composition was coated, in the fashion already indicated in Example 5, with a nickel hydroxy carbonate, except that sodium carbonate was used in place of ammonium carbonate-ammonium hydroxide solution. The product was filtered, washed extensively with alkalized water to remove the soluble salts, and was dried and reduced in hydrogen as previously indicated. Sufficient magnesium chloride was used to give a final loading of 0.5% magnesium oxide, by volume, in the nickel composition. This material was hot-pressed at 600° C., sintered at 1200° C. in hydrogen for 45 minutes, and hot-pressed again. The density obtained was in excess of 95% theoretical. Sufficient ductility remained to allow the fabrication of sheet from this material by hot-rolling at 1000° C.

*Example 8*

This example is similar to Example 5, except that 10 times as much $ThO_2$ was used, thus producing a nickel powder containing 10 volume percent $ThO_2$. In this case, the final stages of the reduction and sintering were carried out at 950° C. The resulting nickel-thoria powder was blended with unmodified nickel powder (carbonyl grade, less than 325 mesh) to give products containing 2, 4 and 7% $ThO_2$. From these and the starting material (10% $ThO_2$), ¼″ rods were prepared.

These rod products were characterized as follows: After heating to 1200° C., Rockwell A hardness for the sample containing 2% $ThO_2$ was 44, for the sample containing 4% $ThO_2$ was 51, for the sample containing 7% $ThO_2$ was 58 and for the sample containing 10% $ThO_2$ was 66. The sample containing 4% $ThO_2$ had a yield strength of 16,500 p.s.i. at 1500° F.; 13,000 p.s.i. at 1800° F.; 18,300 p.s.i. at 1200° F. Thus the decrease in yield strength at 1800° F. is only 21% below the yield strength at 1500° F. This is a major improvement in the characteristic behavior of the metal composition, since nickel alone and most of the nickel base alloys used in high temperature applications show a much larger percentage decrease in yield strength over this temperature range. Pure nickel alone has essentially no strength at 1800° F.

Another improvement by which products of this example are characterized is that of oxidation resistance. The oxidation rate at 1000° C. in air, as measured by gain in weight, is slower for the 4% thoria nickel sample than for a wrought nickel, unmodified control. Specifically the oxidation rate, as measured by weight gain per unit surface area on heating in air at 2200° F. is about equivalent to the rate of oxidation of unmodified nickel at 1500° F. In fact, the oxidation rate of the nickel-thoria is about equal to the oxidation rate of wrought Nichrome (80Ni-20Cr). The stress-rupture properties also indicate stability. For example, a sample of 4% thoria in nickel can withstand 11,000 p.s.i. at 1500° F. for more than 1000 hours without rupture. At 1800° F. this sample can support 4,500 p.s.i. for more than 1000 hours without rupture. The stress-rupture curve measured at 1800° F. of this nickel-thoria sample has a flatter slope than wrought Inconel or Hastelloy X, the latter being measured at a lower temperature, namely 1500° F.

An electron micrograph picture showing the distribution of thoria in a thoria-nickel sample as prepared above (containing 4 volume percent thoria made by dilution of 4 parts of 10 volume percent thoria in nickel with pure nickel) shows that there are regions in which there is a homogeneous distribution of thoria in the nickel. There are also regions in which no thoria can be seen. These areas correspond to the unmodified nickel which was used to blend with the thoria-nickel. Ductility and machinability are better for samples having regions or islands of unmodified metal.

*Example 9*

This example describes an iron-nickel composition containing 5% thoria by volume dispersed therein, the thoria being in the form of colloidal particles 5 to 10 millimicrons in size.

The reactor used to prepare the deposit of iron-nickel hydrous oxycarbonate on the colloidal oxide filler consisted of a stainless steel tank with a conical bottom. The bottom of the tank was attached to stainless steel piping, to which were attached three inlet pipes through T's, this circulating line then passed through a centrifugal pump of 20 g.p.m. capacity, and from the pump the line was returned to the tank. Initially, the tank was charged with 2 gallons of water. Equal volumes of three solutions containing the desired quantities of reagents were then added into the middle of the flowing stream through ⅛″ diameter tubing attached to the T tubes. These solutions were added at uniform equivalent rates over a period of about one-half hour. Through the first T was added a solution of iron nitrate-nickel nitrate prepared by dissolving 2190 g. $Fe(NO_3)_3 \cdot 9H_2O$ and 169 g. $Ni(NO_3)_2 \cdot 6H_2O$ in water and diluting to 3.7 liters. Through the second T was added 3.7 liters of 3.5 molar $(NH_4)_2CO_3$ and through the third 3.7 liters of thoria sol made by diluting 60 g. of 36% $ThO_2$ aquasol with water. The thoria aquasol was highly fluid and contained 5 to 10 millimicron particles.

The solutions were added into the reactor simultaneously while the pump was in operation. The rate of addition was controlled uniformly by flow meters. The pH of the solution in the tank was taken at frequent time intervals to insure proper operating, the final pH being 7.7. The slurry was circulated for a few minutes after the addition of the reagents and had been completed, and then the solution was pumped into a filter. The precipitate was filtered and washed with water, and dried at a temperature of about 300° C. for 24 hours.

This product was then pulverized by grinding in a hammer mill, and screened to pass 325 mesh.

The product was then placed in a furnace at a temperature of about 100° C., and a mixture of argon and hydrogen was slowly passed over the dried powder. This gas stream was carefully freed of oxygen and dried. The temperature in the furnace was slowly raised over a period of an hour. The flow of hydrogen was then gradually increased and the temperature in the furnace also, until a temperature of 600° C. was reached, whereupon a large excess of hydrogen was passed over the sample in order to complete the reduction. Finally, the temperature was raised to 980° C., while continuing to pass hydrogen over the sample. In this way, an iron-nickel powder containing 5 volume percent thoria was produced. This powder had a surface area less than 1 m.²/g.

*Example 10*

This example describes a cobalt-nickel composition modified with 2.5 volume percent thoria, said composition being useful in preparing an improved high temperature alloy.

The preparation followed the general details as outlined in Example 9, except for the following: The feed solutions consisted of: (a) 1125 g. $Co(NO_3)_2 \cdot 6H_2O$ and 2470 g. $Ni(NO_3)_2 \cdot 6H_2O$ in 5 liters $H_2O$, (b) 57.4 g. $ThO_2$ sol containing 36.4% solids diluted to 5 liters, and (c) 1900 g. $(NH_3)_2CO_3$ dissolved in $H_2O$ and diluted to 5 liters. Reduction was carried out at 500 to 600° C. and sintering in hydrogen for ½ hour at 850° C.

This powder (−325 mesh) of modified nickel-cobalt was then useful for blending with other metal powders.

*Example 11*

By substituting calcium carbonate for magnesium carbonate in the process of Example 7, a composition comprising nickel with particulate calcium oxide dispersed therein was prepared.

*Example 12*

A sample of cobalt, containing 7 volume percent thoria, as 10 millimicron particles, was prepared according to Example 8, using cobalt instead of nickel. The resulting modified metal had a yield strength (0.2% offset) of 14,000 p.s.i. at 1500° F.

*Example 13*

A modified iron, molybdenum nickel alloy was prepared directly, as follows: feed solutions of (1) 3220 g. of $Ni(NO_3)_2 \cdot 6H_2O$ and 322 g. $Fe(NO_3)_3 \cdot 9H_2O$ in 5 liters of solution, (2) 1980 g. $ThO_2$ colloid (6.11% solids in the form of 5–10 millimicron particles) diluted to 5 liters, and (3) 4 liters of 5 molar NaOH were added simultaneously, and separately to a heel of 5 liters of solution containing 757 g. of $Na_2MoO_4 \cdot 2H_2O$. The pH of the final slurry was 10.

The precipitate was washed repeatedly until the sodium content was below 0.1% on the solids, and then the material was dried, and reduced at 700° C. and sintered at 1300° C. in pure, dry hydrogen until the oxygen content of the reduced metal, exclusive of $ThO_2$, was less than 0.1%. The resulting metal powder containing 10 volume percent $ThO_2$ filler, in the form of colloidal sized particles, was useful for preparing improved nickel, molybdenum, iron alloys.

*Example 14*

A sample of 10 volume percent thoria in an 85% nickel–15% molybdenum alloy was prepared as follows: To a heel of 5 liters of solution containing 303 g. of $Na_2MoO_4 \cdot 2H_2O$ were added: (1) 5 liters of solution containing 3370 g. $Ni(NO_3)_2 \cdot 6H_2O$, (2) 5 liters of thoria aquasol (containing 98 g. $ThO_2$ as 10 millimicron particles), and (3) 4.15 liters of 20% NaOH. The final pH was 7.4.

The precipitate was washed, dried, and reduced as in Example 13.

*Example 15*

Using a colloid of mixed rare earth oxides (prepared from Lindsay's dydimium chloride) and $Fe(NO_3)_3$, a preparation of 3 volume percent of these oxides in iron was prepared. When this material was extruded into ¼″ rods, as in earlier examples, a modified iron having a yield strength of 11,000 p.s.i. at 1500° F. was obtained. Metallurgical examination of the extruded part showed that the rare earth oxide was very uniformly dispersed as a colloid throughout the iron. The particle size of the filler in the final iron product was in the range of about 55 millimicrons.

This application is a continuation-in-part of our copending application U.S. Serial No. 657,507, filed May 7, 1957, now abandoned.

We claim:

1. In a process for producing a metal of the group consisting of iron, cobalt and nickel and alloys of these metals with each other and with other metals whose oxides have a free energy of formation at 27° C. of from 30 to 70 kilocalories per gram atom of oxygen, said metal having improved properties by having uniformly dispersed therein a plurality of discrete, submicron-sized particles of a refractory oxide the steps comprising (a) precipitating a water-insoluble, hydrous, oxygen-containing compound of the metal to be improved, wherein the metal is in an oxidized state, as a coating around a plurality of substantially discrete, submicron sized particles of a metal-oxygen compound which, when heated to constant weight at 1500° C., is a refractory oxide having a melting point above 1000° C. and a free energy of formation at 1000° C. above 60 kilogram calories per gram atom of oxygen, and drying the precipitate-coated particles so produced, (b) thereafter reducing the deposited coating to the corresponding metal by bringing it into contact with a reducing gas while maintaining a temperature throughout the mass below the sintering temperature of the metal, and (c) sintering the reduced product to a dense mass at a temperature below the melting point of the metal.

2. In a process for producing a composition of a metal of the group consisting of iron, cobalt and nickel and alloys of these metals with each other and with other metals whose oxides have a free energy of formation at 27° C. of from 30 to 70 kilocalories per gram atom of oxygen, said composition having improved high temperature service characteristics, by having uniformly dispersed therein a plurality of discrete particles of a refractory oxide, said particles being in the size range of 5 to 200 millimicrons, the steps comprising (a) precipitating a water-insoluble, hydrous, oxygen-containing compound of the metal of said group, in which compound the metal is in an oxidized state, as a coating around a plurality of substantially discrete particles, having an average dimension of 5 to 250 millimicrons, of a metal-oxygen compound which when heated to constant weight at 1500° C. is a refractory oxide having a melting point above 1000° C. and a free energy of formation at 1000° C. above 60 kilocalories per gram atom of oxygen and drying the precipitate-coated particles so produced, (b) reducing the deposited coating to the corresponding metal by bringing it into contact with a reducing gas while maintaining a temperature throughout the mass below the sintering temperature of the metal, and (c) sintering the reduced product to a dense mass at a temperature below the melting point of the metal.

3. A process of claim 2 in which the reduced product is compacted to a mass of metal having an apparent density from 90 to 100% of the absolute density.

4. A process of claim 2 in which reducible compounds of at least two metals selected from the group consisting of iron, cobalt, nickel and other metals whose oxides have a free energy of formation at 27° C. of from 30 to 70 kilocalories per gram atom of oxygen are included in the metal compound coating, the major metal constituent in the coating being selected from the group consisting of iron, cobalt, and nickel, whereby upon reduction a mixture of said metals containing the dispersed oxide is obtained.

5. A process of claim 4 in which the sintered product is compacted until its apparent density is from 90 to 100% of the absolute density.

6. In a process for producing a metal composition in which a plurality of discrete, submicron-sized particles of a refractory oxide is uniformly dispersed the steps comprising depositing a hydrous, oxygen-containing compound of a metal of the group consisting of iron, cobalt and nickel upon particles, having an average dimension of 10 to 150 millimicrons, of a refractory oxide having a melting point above 1000° C. and a free energy of formation at 1000° C. above 60 kilocalories per gram atom of oxygen, reducing the deposited coating to the corresponding metal by bringing it into contact with a reducing gas while maintaining a temperature throughout the mass below the sintering temperature of the metal, and sintering the reduced product at a temperature below the melting point of the metal to a dense mass having a surface area less than 1 square meter per gram.

7. A process of claim 6 in which the refractory oxide is initially present in the form of a colloidal aquasol.

8. In a process for producing a metal of the group consisting of iron, cobalt, and nickel and alloys of these metals with each other and with other metals whose oxides have a free energy of formation at 27° C. of from 30 to 70 kilocalories per gram atom of oxygen, said metal having improved high-temperature service characteristics by reason of having dispersed uniformly therein a plurality of discrete, submicron-sized particles of refractory oxide having a melting point above 1000° C. and a free energy of formation at 1000° C. above 60 kilocalories per gram atom of oxygen, the steps comprising (a) adding, simultaneously but separately, (1) a water-soluble salt of the metal to be produced, (2) a colloidal aquasol of the refractory oxide, and (3) an alkali, to a heel of water, whereby there is precipitated a water-insoluble, hydrous oxide of the metal to be produced, as a coating around substantially discrete particles of the refractory oxide in the colloidal size range, and drying the precipitate-coated particles so produced, (b) reducing the deposited coating to the corresponding metal by bringing it into contact with a reducing gas while maintaining a temperature throughout the mass below the sintering temperature of the metal, and (c) sintering the reduced product to a dense mass at a temperature below the melting point of the metal.

References Cited in the file of this patent

UNITED STATES PATENTS

| | | |
|---|---|---|
| 1,986,197 | Harshaw | Jan. 1, 1935 |
| 2,100,537 | Conway | Nov. 30, 1937 |
| 2,224,595 | Dawihl | Dec. 10, 1940 |
| 2,382,338 | Shobert | Aug. 14, 1945 |
| 2,682,511 | Cronin | June 29, 1954 |
| 2,783,529 | Huntress | Mar. 5, 1957 |
| 2,785,974 | Moore | Mar. 19, 1957 |
| 2,823,988 | Grant | Feb. 18, 1958 |
| 2,853,401 | Mackiw et al. | Sept. 23, 1958 |
| 2,855,491 | Navias | Oct. 7, 1958 |